(12) United States Patent
Zhu

(10) Patent No.: US 10,403,227 B2
(45) Date of Patent: Sep. 3, 2019

(54) INTEGRATED LIQUID CRYSTAL DISPLAY DEVICE AND ELECTROCHROMIC DEVICE AND DRIVING METHOD FOR DISPLAYING IMAGES

(71) Applicant: SHENZHEN CHINA STAR OPTOELECTRONICS TECHNOLOGY CO., LTD., Shenzhen (CN)

(72) Inventor: Jiang Zhu, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 14/906,297

(22) PCT Filed: Jan. 11, 2016

(86) PCT No.: PCT/CN2016/070597
§ 371 (c)(1),
(2) Date: Jan. 20, 2016

(87) PCT Pub. No.: WO2017/107254
PCT Pub. Date: Jun. 29, 2017

(65) Prior Publication Data
US 2018/0286335 A1    Oct. 4, 2018

(30) Foreign Application Priority Data

Dec. 22, 2015 (CN) .......................... 2015 1 0973449

(51) Int. Cl.
G09G 3/38          (2006.01)
G02F 1/15          (2019.01)
(Continued)

(52) U.S. Cl.
CPC ............ G09G 3/38 (2013.01); G02F 1/1333 (2013.01); G02F 1/1368 (2013.01);
(Continued)

(58) Field of Classification Search
CPC .......... G09G 3/38; G09G 3/3648; G09G 3/36; G09G 2310/08; G09G 2310/0235;
(Continued)

(56) References Cited

U.S. PATENT DOCUMENTS 8,077,374 B2   12/2011  Jang et al.
8,976,437 B2 *  3/2015  Zhou ...................... G02F 1/167
                                                               359/265
(Continued)

FOREIGN PATENT DOCUMENTS

CN     101211085 A    7/2008
CN     101216652 A    7/2008
(Continued)

*Primary Examiner* — Darlene M Ritchie
(74) *Attorney, Agent, or Firm* — Mark M. Friedman

(57) ABSTRACT

A liquid crystal display device mainly includes an upper substrate, a lower substrate, a backlight module, an electrochromic electrode layer, an electrochromic layer, a common electrode layer, a liquid crystal layer, a pixel electrode layer, a thin film transistor (TFT) switching layer, and a storage capacitor layer. Subpixels of the liquid crystal display device can successively display red, green, and blue three primary colors at different times to enhance display resolution of the liquid crystal display device. Further, since the electrochromic device has better reflectivity and contrast, the image display effect can be enhanced.

3 Claims, 4 Drawing Sheets

(51) Int. Cl.
*G02F 1/1362* (2006.01)
*G02F 1/1368* (2006.01)
*G02F 1/155* (2006.01)
*G09G 3/36* (2006.01)
*G02F 1/1333* (2006.01)
*G02F 1/163* (2006.01)
*G02F 1/1514* (2019.01)

(52) U.S. Cl.
CPC .......... *G02F 1/136213* (2013.01); *G02F 1/15* (2013.01); *G02F 1/155* (2013.01); *G02F 1/163* (2013.01); *G09G 3/36* (2013.01); *G09G 3/3648* (2013.01); *G02F 2001/15145* (2019.01); *G02F 2201/44* (2013.01); *G02F 2203/34* (2013.01); *G09G 2300/023* (2013.01); *G09G 2310/0235* (2013.01); *G09G 2310/08* (2013.01)

(58) Field of Classification Search
CPC ............................................................. G09G 2300/023; G02B 27/0172; G02F 1/15; G02F 1/155; G02F 1/163; G02F 2001/1512; G02F 2201/44; G02F 1/136213; G02F 1/1368; G02F 1/1333; G02F 2001/15145; G02F 2203/34
See application file for complete search history.

(56) References Cited

U.S. PATENT DOCUMENTS

| | | | | |
|---|---|---|---|---|
| 2006/0192726 | A1* | 8/2006 | Huitema | G06F 1/1601 345/1.1 |
| 2006/0209383 | A1* | 9/2006 | Burdis | G02F 1/1523 359/265 |
| 2010/0060825 | A1* | 3/2010 | Jang | B82Y 20/00 349/86 |
| 2010/0243427 | A1* | 9/2010 | Kozlowski | C03C 17/3417 204/192.1 |
| 2013/0271812 | A1* | 10/2013 | Brown | E06B 9/24 359/275 |
| 2014/0085699 | A1* | 3/2014 | Huang | G02F 1/15 359/270 |
| 2014/0168745 | A1* | 6/2014 | Satou | G02F 1/163 359/266 |
| 2014/0198371 | A1* | 7/2014 | Conklin | G02F 1/163 359/275 |
| 2014/0362429 | A1* | 12/2014 | Yokozeki | H01L 27/3232 359/267 |
| 2015/0131036 | A1* | 5/2015 | Yu | G02F 1/133528 349/96 |
| 2016/0349589 | A1 | 12/2016 | Sun et al. | |
| 2017/0082881 | A1* | 3/2017 | Wang | H01L 27/124 |
| 2017/0154589 | A1* | 6/2017 | Yang | G09G 3/3648 |
| 2017/0199383 | A1* | 7/2017 | Machida | G02F 1/155 |
| 2018/0322845 | A1* | 11/2018 | Machida | G02B 26/026 |

FOREIGN PATENT DOCUMENTS

| | | | |
|---|---|---|---|
| CN | 101859037 A | * 10/2010 | ............ G09G 3/36 |
| CN | 101859037 A | 10/2010 | |
| CN | 104834146 A | 8/2015 | |
| EP | 2209040 A2 | 7/2010 | |
| KR | 20080095976 A1 | 10/2008 | |

\* cited by examiner

INTEGRATED LIQUID CRYSTAL DISPLAY DEVICE AND ELECTROCHROMIC DEVICE AND DRIVING METHOD FOR DISPLAYING IMAGES

BACKGROUND OF THE INVENTION

Field of Invention

The present invention relates to a display technology, and in particular to a liquid crystal display device and a driving method for displaying images on the liquid crystal display device.

Description of Prior Art

With a rising demand for the resolution of a liquid crystal display device, each of monitor manufacturers continues to introduce new technologies to improve the display resolution. Pixels of the conventional liquid crystal display device consist of red, green, and blue three primary colors. By the principle of space color mixing, various desired colors are formed by mixing the three primary colors. Therefore, for the liquid crystal display device of a certain resolution, it actually utilizes treble subpixels. Therefore, the actual resolution is only one-third of the number of the subpixels.

The basic principle of electrochromic display technology is using an oxidation-reduction reaction occurring in some organic material during electrolysis, leading to changes in reflection and absorption characteristics for the light with different wavelengths in ambient light, thereby producing an electrochromic phenomenon of reversible color changes. Since the electrochromic phenomenon is a phenomenon caused by the change of charges, that is, in order to change the tone or color of electrochromic material, desired amount of charges for a certain oxidation-reduction reaction must be provided to electrochromic electrodes. Electrochromic device (ECD) has a wide viewing angle, low driving voltage, no power consumption memory, and other unique characteristics, so it has a wide range of applications.

If the subpixels of the liquid crystal display device can successively show red, green, and blue three primary colors at different times, according to the principle of color mixing, the display resolution of the liquid crystal display device with such features will be able to raise three times.

Therefore, the present invention is accomplished in view of the above-mentioned issue. Its objective is to provide a new liquid crystal display device and a display driving method thereof for improving the display resolution of the monitors.

SUMMARY OF THE INVENTION

An objective of the present invention is to provide a new liquid crystal display device, which is mainly composed of a TFT substrate, a liquid crystal cell, an electrochromic device (ECD), and a backlight module. By means of providing different driving voltages to the electrochromic device at different times, the subpixels of the liquid crystal display device can successively display red, green, and blue three primary colors at different times to enhance the display resolution of the liquid crystal display device. Further, since the electrochromic device has a better reflectivity and contrast, the image display effect can be enhanced.

To achieve the foregoing objective, a preferred embodiment of the present invention provides a liquid crystal display panel. The liquid crystal display panel includes an upper substrate; a lower substrate; an electrochromic electrode layer disposed below the upper substrate; an electrochromic layer disposed below the electrochromic electrode layer; a common electrode layer disposed below the electrochromic layer; a common electrode layer, which comprises liquid-crystal molecules, disposed below the electrochromic layer; a pixel electrode layer disposed below the liquid crystal layer; a thin film transistor (TFT) switching layer; and a storage capacitor layer; wherein an electrochromic device is formed between the electrochromic electrode layer and the common electrode layer, and the TFT switching layer and the storage capacitor layer are disposed between the lower substrate and the common electrode layer.

In accordance with the above-mentioned embodiment of the present invention, the electrochromic layer can include one or two electrochromic materials.

In accordance with the above-mentioned embodiment of the present invention, the electrochromic layer can include electrochromic materials of a cathode and an anode.

In accordance with the above-mentioned embodiment of the present invention, the electrochromic device forms an electric field for controlling color of the electrochromic materials after a voltage is applied thereto.

In accordance with the above-mentioned embodiment of the present invention, the TFT switching layer and the storage capacitor layer are coupled to the pixel electrode layer.

Another preferred embodiment of the present invention provides a liquid crystal display device. The liquid crystal display device includes a liquid crystal display panel and a backlight module; the liquid crystal display panel including an upper substrate and a lower substrate, an electrochromic electrode layer, which is between the upper substrate and the lower substrate, disposed below the upper substrate; an electrochromic layer disposed below the electrochromic electrode layer; a common electrode layer disposed below the electrochromic layer; a common electrode layer, which comprises liquid-crystal molecules, disposed below the electrochromic layer; a pixel electrode layer disposed below the liquid crystal layer and disposed above the backlight module; a thin film transistor (TFT) switching layer; and a storage capacitor layer, wherein an electrochromic device is formed between the electrochromic electrode layer and the common electrode layer.

In accordance with the above-mentioned embodiment of the present invention, the electrochromic layer can include one or two electrochromic materials.

In accordance with the above-mentioned embodiment of the present invention, the electrochromic layer can include electrochromic materials of a cathode and an anode.

In accordance with the above-mentioned embodiment of the present invention, the electrochromic device forms an electric field for controlling color of the electrochromic materials after a voltage is applied thereto.

In accordance with the above-mentioned embodiment of the present invention, the TFT switching layer and the storage capacitor layer are coupled to the pixel electrode layer.

In accordance with the above-mentioned embodiment of the present invention, a backlight source of the backlight module is one of a light-emitting diode (LED), a cold cathode fluorescent lamp (CCFL), an organic electroluminescent device (OLED), a light-emitting electrochemical cell (LEC).

Still another preferred embodiment of the present invention provides a driving method for displaying images on the liquid crystal display device. The method includes receiving data signals of an image frame, in a time interval of one image frame, and sequentially driving the electrochromic device of the liquid crystal display device such that the corresponding red, green, and blue data signals of each image frame are sequentially shown on the liquid crystal display device; wherein the electrochromic device of the liquid crystal display device is driven by applying a control voltage to the electrochromic device.

In accordance with the driving method of the embodiment of the present invention, the received the data signal of the image frame controls a light incident on the electrochromic device to show different grayscale brightness by twist angles of the liquid-crystal molecules.

In accordance with the driving method of the embodiment of the present invention, the control voltage applied to the electrochromic device is different control voltages according to different display colors.

In accordance with the driving method of the embodiment of the present invention, a received horizontal synchronizing signal, vertical synchronizing signal, and red, green and blue data signals of the images generate corresponding monochromatic display synchronizing signals and enable control signals of the electrochromic device for perform monochromatic display of red, green and blue signals.

The beneficial effects lie in:

In comparison with the prior art liquid crystal display device, since the subpixels of the pixel units of the liquid crystal display device of the embodiment of the present invention can successively show red, green, and blue three primary colors at different times, as to the number of the pixel units which is the same to that of the conventional liquid crystal display device, the resolution of the liquid crystal display device of the embodiment of the present invention can be increased to three times as much as the resolution of the conventional liquid crystal display device. Moreover, since the electrochromic device has a better reflectivity and contrast, the present invention can obtain an excellent image display effect.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Figure 1:
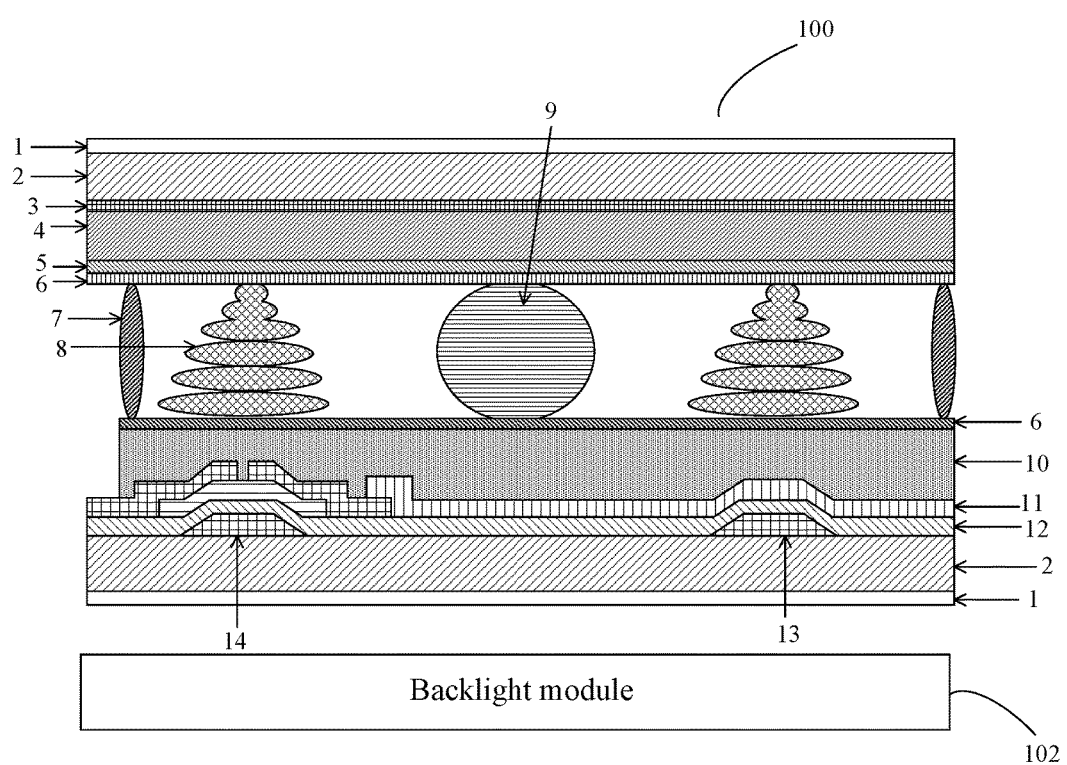
FIG. 1 is a sectional view schematically illustrating a liquid crystal display panel of a liquid crystal display device according to one preferred embodiment of the present invention.

As used herein, the word "exemplary" means "serving as an example, instance, or illustration. In addition, the articles "a" and "an" as used in this application and the appended claims may generally be construed to mean "one or more" unless specified otherwise or clear from context to be directed to a singular form. Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

Descriptions of the following embodiments refer to attached drawings which are utilized to exemplify specific embodiments. The same reference numerals in the embodiments refer to the same parts or like parts throughout the various figures. The embodiments are utilized to explain and understand the present invention but not to limit the present invention.

Referring to FIG. 1, FIG. 1 is a sectional view schematically illustrating a liquid crystal display panel of a liquid crystal display device according to one preferred embodiment of the present invention.

The liquid crystal display device of the present invention includes a liquid crystal display panel 100 (as shown in FIG. 1) and a backlight module 102. As shown in FIG. 1, the topmost and lowest layers of the liquid crystal display panel 100 respectively has an upper polarizer 1 and a lower polarizer 1, and then an upper substrate 2 and a lower substrate 2 are respectively disposed inwardly. Then there are an electrochromic electrode layer 3, an electrochromic layer 4, a common electrode layer 5, an alignment layer 6, a frame sealing glue 7, a liquid crystal layer 8, a spacer 9, a protective layer 10, an ITO pixel electrode layer 11, a gate insulation layer 12, a storage capacitor layer 13, and a thin film transistor (TFT) switching layer 14 sequentially disposed below the upper substrate 2.

In the preferred embodiment, the polarizer 1 is used to determine the polarization state of light passing through it. The upper and lower substrates 2 are made of glass or other transparent material, and the TFT switching layer 14 and the storage capacitor layer 13 are formed on the lower substrate 2. The electrochromic electrode layer 3 is an ITO transparent electrode. The electrochromic layer 4 is organic or inorganic discoloring material, and it also is a generation layer of a discoloring reaction. The liquid crystal layer 8, which contains liquid-crystal molecules, is an important element to change the polarization state of the light. Their arrangement and the polarization state are determined by electricity and elastic force together. The TFT switching layer 14 is used for controlling signal voltages of a control circuit on the liquid crystal display panel 100 and transferring them to the liquid crystal molecules of the liquid crystal layer 8, in order to determine the magnitude of twist angles of the liquid crystal molecules. The twist angles of the liquid crystal molecules determine transmittance. Through the light of the different twist angles of the liquid crystal molecules, the liquid crystal display device is capable of displaying a different grayscale images. The storage capacitor layer 13 is utilized to keep the voltage generated by the TFT switching layer 14.

The pixel unit (see FIG. 2) of the liquid crystal display panel 100 includes a plurality of data lines (not shown), a plurality of scanning lines (not shown), the TFT switching layer 14, the pixel electrode layer 11, the common electrode layer 5, and a drain connecting component (not shown). At least one of the data lines coupled to a source of the TFT switching layer 14 is utilized to provide pixel voltages. At least one of the scanning lines coupled to a gate of the TFT switching layer 14 are utilized to provide scanning signals for conducting the source and drain of the TFT switching layer 14. The pixel electrode layer 11 is utilized to electrically couple to the drain of TFT switching layer 14 and utilized to form an electric field, which controls the liquid-crystal molecules to twist in a horizontal plane in the liquid crystal layer 8, with the common electrode layer.

The liquid crystal display panel 100 of the present invention is driven by an active matrix. By the light incident on the lower polarizer 1 from the white backlight source, the traveling light will be polarized and then penetrates the liquid-crystal molecules within the liquid crystal layer 8. The backlight source (not shown) of the backlight module 102 of the present invention can be the sources of a light-emitting diode (LED), a cold cathode fluorescent lamp (CCFL), an organic electroluminescent device (OLED), a light-emitting electrochemical cell (LEC), a cold cathode fluorescent lamp (CCFL), and so on, which can emit white light. OLED has the advantages of slimness, energy saving, vibration proof, flexible display realization etc., and OLED is a surface light source without disposing a light guide plate on the backlight module. In the OLED device, the structure and process of the lighting device are more simple and low-cost. If a point light source or a line light source is employed, in order to make the backlight module 102 emit light uniform, the light guide plate is also provided in the backlight module 102.

Figure 2:
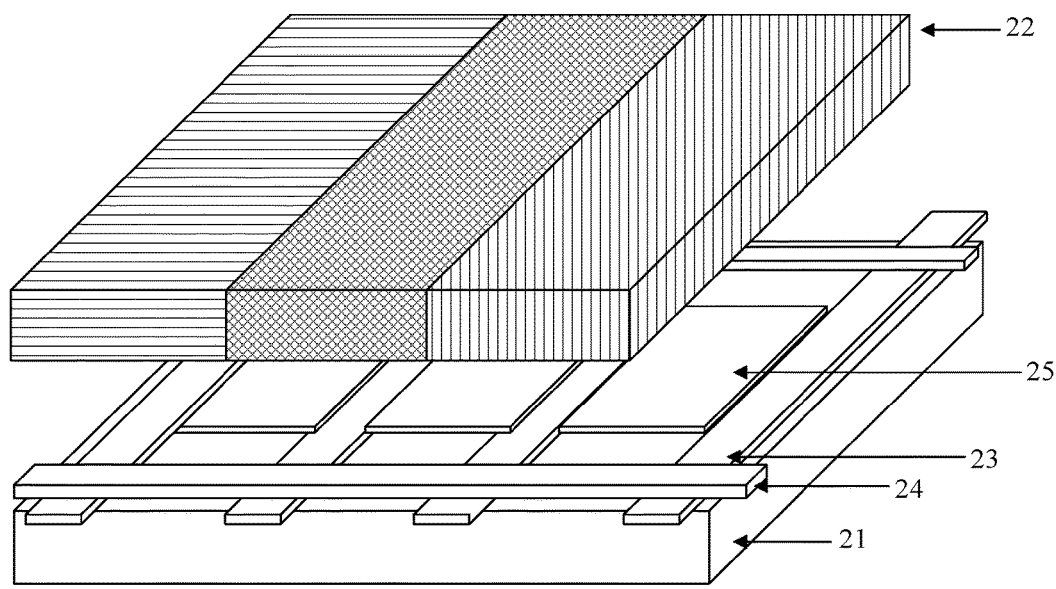
FIG. 2 is a part of the array substrate and electrochromic device above the liquid crystal display panel of the present invention as shown in FIG. 1.

Referring to FIG. 1 and FIG. 2, FIG. 2 is a part of the array substrate and electrochromic device 22 above the liquid crystal display panel 100 of the present invention as shown in FIG. 1. In order to make the focus of the present invention more clear, the alignment layer 6, frame sealing glue 7, liquid crystal layer 8, spacer 9, protective layer 10 and other devices between the upper and lower substrates above the liquid crystal display panel 100 as shown in FIG. 1 are temporarily omitted in FIG. 2. It can be observed in FIG. 2 that the bottom is a section of the array substrate 21 consisting of TFTs and the top is the electrochromic device 22 consisting of ECD. The section of the array substrate 21 consisting of TFTs in the bottom further includes the lower substrate 2, the data lines 23, the scanning lines 24, and other devices, i.e., the pixel unit 25 of the liquid crystal display panel 100 not illustrated in the above-mentioned drawing.

Figure 3:
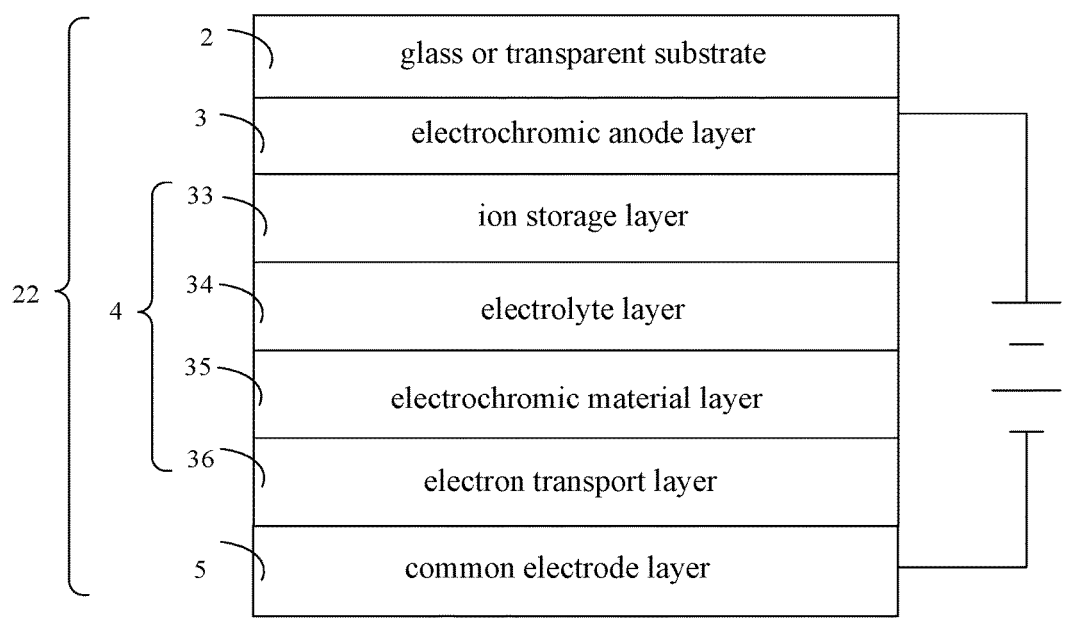
FIG. 3 is a structure of the electrochromic device according to one preferred embodiment of the present invention.

Referring to FIG. 3, FIG. 3 is a structure of the electrochromic device 22 according to one preferred embodiment of the present invention. The most important characteristic of ECD technology is that a pixel can display a variety of different colors by loading different voltages on it. As the electrochromic device 22 consisting of ECD shown in FIG. 2, in one preferred embodiment of the present invention, the electrochromic device 22 shown in FIG. 3 may include one or two electrochromic materials formed by a multilayer film. By adjusting the magnitude of the voltage or current, the electrochromic material can carry out an electrochemical reaction, whose products have different degrees of absorption for the light of a specific wavelength, thereby showing different colors. The electrochromic device 22 from top to bottom may respectively have the upper substrate 2, an electrochromic anode layer 3, such as ITO or FTO electrodes which has a transparent conductive effect, an ion storage layer 33, an electrolyte layer 34, an electrochromic material layer 35, an electron transport layer 36, a common electrode layer 5 such as ITO or FTO electrode. When the electrochromic device 22 works, a certain voltage is applied between the two transparent electrodes, and a stable and reversible change in optical properties (such as reflectance, transmittance, absorbance, etc.) occurs in the electrochromic material at the voltage. Visually it shows the reversible change in color and transparency and can act as a filter, in order to achieve R, G, and B reversibly alternating colors.

Furthermore, the role of the electrochromic layer 4 in FIG. 1 represents the effect of the composition of the ion storage layer 33, the electrolyte layer 34, electrochromic material layer 35, and the electron transport layer 36 in FIG. 3.

The electrolyte layer 34 disposed below the electrochromic anodic layer 3 provides ions for the electrochromic layer 34. The electrolyte layer 34 may be composed of special conductive ion material, such as lithium perchlorate, sodium perchlorate, and other conductive solution or solid electrolyte material. The common electrode layer 5 is disposed on the lowest layer of the electrochromic device 22, and utilized as the cathode with respect to the electrochromic anode layer 3. The electrochromic material layer 35 includes the electrochromic material. When the electrochromic device 22 works, a specific electric field is applied between the electrochromic anode layer 3 and the common electrode layer 5. The oxidation-reduction reaction under the effect of the electric field occurs in the electrochromic material of the electrochromic material layer 35. The color of the electrochromic material changes. That is, Coloration occurs in the electrochromic material layer 35 after receiving the ions provided by the ion storage layer 33. Preferably, the electrochromic material layer 35 may be selected from the transition metal oxides consisting of tungsten oxide, molybdenum oxide, chromium oxide, vanadium oxide, titanium oxide, and nickel oxide.

When the oxidation-reduction reaction occurs in the electrochromic material, the ion storage layer 33 stores corresponding reverse ions to keep the entire charge balance. The ion storage layer 33 can also be the material electrically opposite to the electrochromic layer. This can achieve color additive or complementary role. In one preferred embodiment of the present invention, the electrochromic material layer 35 uses a cathode (reduction) coloring material, and the ion storage layer 33 uses an anode (oxidation) coloring material as a second electrochromic layer. The electrochromic material simultaneously includes the cathode and anode. The two materials can simultaneously get color or remove color, to increase the optical density variation of the device and enhance the amount of penetration change. That is, When the driving voltage is loaded between the electrochromic anode layer 3 and the common electrode layer 5, the positive ions in the electrochromic material layer 35 accept electrons and then occur the reduction reaction to change the color of the electrochromic material, and the negative ions of the ion storage layer 33 lose electrons and then occur the oxidation reaction to change the color of the electrochromic material so that the pixel displays the color point faster.

Figure 4:
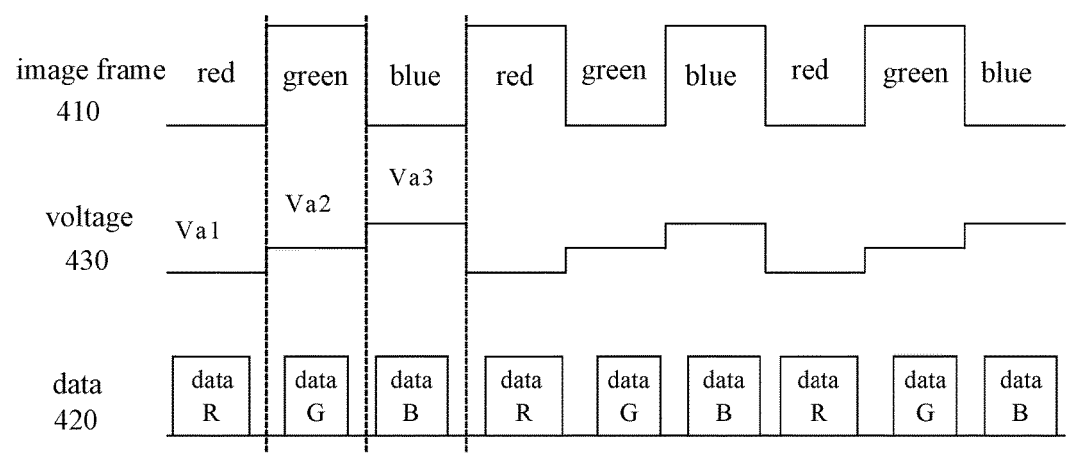
FIG. 4 is a timing chart illustrating the display driving of the liquid crystal display device of the present invention.

FIG. 4 is a timing chart illustrating the display driving of the liquid crystal display device of the present invention. The driving manner of the liquid crystal display device 100 of the present invention is to receive red, green and blue data signals 420 of an image frame 410, in a time interval of one image frame, and to sequentially drive the electrochromic device 22 in FIG. 3 of the liquid crystal display device 100 such that the corresponding red, green, and blue data signals 420 of each image frame 410 are sequentially shown on the liquid crystal display device 100. Then the color images can be displayed by using time color mixing principle. As shown in FIG. 4, the electrochromic device 22 of the liquid crystal display panel 100 is driven by applying the control voltages 430, such as Va1, Va2 and Va3 corresponding to red, green and blue, to the electrochromic device 22. In other words, the color of the electrochromic material can present red, green, and blue by sequentially providing different driving voltages for the electrochromic device 22 of the pixels of the display device 22 in one period. There is not much difference between the smoothness of the color images and that driven by the white light emitted from the backlight passing through the liquid crystal cell in the prior art. Moreover, because of the use of the electrochromic device 22, the white light is filtered into red, green, and blue in turn. The transmitted white light is controlled by the twist angle of the liquid crystal, thereby achieving grayscale display. Then, so the pixels can display the colors with different grayscales through the time color mixing principle.

In general, a time interval for driving a single image frame in 75 hertz (Hz) is 13.3 ms. During the time interval of one image frame, in sequentially displaying the frame of red image, the frame of green image, and the frame of blue image corresponding to each image frame, the time interval of each frame of the monochrome image is approximately 4.44 ms. Such a short time interval will not be aware of changes in the image frame. Moreover, a display control module is employed to adjust and generate timing control signals. When a horizontal synchronizing signal (HSYNC), a vertical synchronizing signal (VSYNC), and red (R), green (G) and blue (B) data signals of the input images are received, the display control module generates corresponding monochromatic display synchronizing signals. They are also smooth and have no much difference with respect to the color images driven and displayed by the prior art. Moreover, enable control signals of the electrochromic device 22 has been able to sequentially display monochromatic tone of the R, G, B signals. A display voltage control module supplies corresponding control voltages applied to the electrochromic device 22, and supplies reference voltages as the driving data of the pixel units. The durations of the control voltages applied to the electrochromic device 22 are also controlled according to the length of the action of the electrochromic material.

Although the color images displayed by the liquid crystal display device of the present invention are produced by superimposing the frame of red image, the frame of green image, and the frame of blue image with a slight time difference, and due to the persistence of vision of the human eye, the perceived color images of the liquid crystal display device of the present invention are also smooth and there is not much difference from the color images driven and displayed by the prior art. Further, since the electrochromic device has a better reflectivity and contrast, the image display effect can be enhanced.

In comparison with the liquid crystal display device of the embodiments of the present invention and the prior art liquid crystal display device, the subpixels of the pixel units of the liquid crystal display device of the embodiment of the present invention can successively show red, green, and blue three primary colors at different times, so the resolution can be increased by 3 times for the same number of unit pixels. Further, since the electrochromic device has a better reflectivity and contrast, the present invention has a better image display effect.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A driving method for displaying images on a liquid crystal display device comprising a liquid crystal display panel and a backlight module, the liquid crystal display panel comprising an upper substrate and a lower substrate; an electrochromic electrode layer disposed below the upper substrate; an electrochromic layer disposed below the electrochromic electrode layer; a common electrode layer disposed below the electrochromic layer; a liquid crystal layer, which comprises liquid-crystal molecules, disposed below the electrochromic layer; a pixel electrode layer disposed below the liquid crystal layer and disposed above the backlight module; a thin film transistor (TFT) switching layer; and a storage capacitor layer; wherein an electrochromic device is formed between the electrochromic electrode layer and the common electrode layer and comprises an ion storage layer, an electrolyte layer, an electrochromic material layer, and an electron transport layer; and wherein the ion storage layer comprises an anode coloring material, and the driving method comprising the steps of:

receiving data signals of an image frame, in a time interval of one image frame, and sequentially driving the electrochromic device of the liquid crystal display device such that the corresponding red, green, and blue data signals of each image frame are sequentially shown on the liquid crystal display device;

wherein the electrochromic device of the liquid crystal display device is driven by applying a control voltage to the electrochromic device, and wherein a received horizontal synchronizing signal, vertical synchronizing signal, and red, green and blue data signals of the images generate corresponding monochromatic display synchronizing signals and enable control signals of the electrochromic device for successively performing monochromatic display of red, green and blue signals.

2. The driving method for displaying images on the liquid crystal display device according to claim 1, wherein the received data signals of the image frame control a light incident on the electrochromic device to show different grayscale brightness by twist angles of the liquid-crystal molecules.

3. The driving method for displaying images on the liquid crystal display device according to claim 1, wherein the control voltage applied to the electrochromic device is different control voltages according to different display colors.

* * * * *